United States Patent [19]

Taue

[11] Patent Number: 5,148,987
[45] Date of Patent: Sep. 22, 1992

[54] HIGH PRESSURE FUEL INJECTION DEVICE FOR ENGINE

[75] Inventor: Jun Taue, Iwata, Japan

[73] Assignee: Yamaha Hatsudoki Kabushiki Kaisha, Iwata, Japan

[21] Appl. No.: 725,550

[22] Filed: Jul. 3, 1991

[30] Foreign Application Priority Data

Jul. 5, 1990 [JP] Japan ................................. 2-178897

[51] Int. Cl.$^5$ ............................................. F02M 47/02
[52] U.S. Cl. ....................................... 239/96; 239/585.3
[58] Field of Search ............ 239/88, 96, 533.4, 585.1, 239/585.3

[56] References Cited

U.S. PATENT DOCUMENTS

| | | | |
|---|---|---|---|
| 4,627,571 | 12/1986 | Kato et al. | 239/96 |
| 4,948,049 | 8/1990 | Brisbon et al. | 239/96 X |
| 4,993,637 | 2/1991 | Kanesaka | 239/96 |
| 5,004,154 | 4/1991 | Yoshida et al. | 239/96 |
| 5,014,671 | 5/1991 | Taue et al. | 239/96 X |
| 5,058,614 | 10/1991 | Plohberger et al. | 239/96 X |

FOREIGN PATENT DOCUMENTS 0409264  1/1991  European Pat. Off. .............. 239/88

Primary Examiner—Andres Kashnikow
Assistant Examiner—William Grant
Attorney, Agent, or Firm—Ernest A. Beutler

[57] ABSTRACT

An accumulator type fuel injector system including an arrangement for insuring that the injector will provide a relatively constant rate of fuel discharge under low speed low load conditions and a rate of discharge under high speed high load conditions that reaches its peak at the latter portion of the injection valve opening cycle. This is done by changing the effective areas of the various components of the valve, the preload of the biasing spring and the rate of the biasing spring.

11 Claims, 5 Drawing Sheets

HIGH PRESSURE FUEL INJECTION DEVICE FOR ENGINE

BACKGROUND OF THE INVENTION

This invention relates to a high pressure fuel injection unit for an engine and more particularly to an improved accumulator type injector nozzle for engines.

A popular and very effective type of injection nozzle for injecting fuel to an internal combustion engine is the so called "accumulator type". With this type of injection nozzle, there is provided an accumulator chamber in which fuel is stored under pressure and which can communicate with the engine through a discharge port. An injection valve is mounted within the accumulator chamber and controls the opening and closing of the discharge port. There is also provided a control chamber that receives fuel under pressure from the accumulator chamber and the injection valve has a portion that is supported within this control chamber. As a result, the control chamber pressure acts on the injection valve and assists in maintaining it in a closed position. A control valve selectively relieves the pressure in the control chamber. When this occurs, the pressure of the fuel in the accumulator chamber will cause the injection valve to open and fuel to be discharged. With this type of system, it is also the practice to employ a biasing spring that acts on the injector valve so as to urge it to its closed position in cooperation with the fuel pressure in the control chamber.

Although this type of injection nozzle is very effective, it is difficult at times to provide good running at low engine speeds such as idle. The reason for this is that at low pressures under low speed operation the amount of fuel discharged will increase significantly for a given increase in fuel pressure. This may be understood best by reference to FIG. 1 which is a graphical view showing the fuel pressure in the accumulator chamber in relation to the amount of fuel discharged during four varying running conditions, indicated by the curves a, b, c and d. The curves a, b, c and d indicate respectively increasing engine speeds with the curve a being idle speed and the curve d being wide open throttle, maximum engine speed. It can be seen that the curve a is quite sharp. Hence a small difference in fuel pressure in the accumulator chamber will make a substantial difference in the amount of fuel injected.

It is very difficult to control adequately the pressure of the fuel in the accumulator chamber at low engine speeds. This is because the fuel pressure changes with a number of variables primarily at temperature, which effects the viscosity.

In order to reduce these fluctuations in amount of fuel discharge at low engine speeds in response to pressure variations, it has been proposed to increase the biasing preload of the spring that cooperates with the pressure in the control chamber to hold the injection valve in its closed position. Although an increased spring preload will lessen the slope of the curves shown in FIG. 1, this gives rise to another problem. That is, at high engine speeds when the actual time duration of opening of the injection nozzle is quite short, it may be impossible to inject sufficient fuel so as to achieve maximum performance. Therefore, the previously proposed systems have not been effective in solving the aforenoted problem while at the same time maintaining maximum engine output.

It has been proposed to offset these disadvantages through the use of an arrangement for varying the preload on the biasing spring which holds the injector valve in its closed position. Such an arrangement is shown in application Ser. no. 07/556,234 as invented by me, entitled ACCUMULATOR TYPE INJECTION NOZZLE, filed Jul. 20, 1990 and assigned to the assignee thereof. Such a device is effective in changing the shape of the delivery curves from those shown in FIG. 1 to the curves identified as a, 'b,' c' and d' in FIG. 2. Although this construction provides a very efficient result, still further improvements are possible.

The reason for this may be best understood by reference to FIGS. 3 and 4 wherein fuel delivery rate curves with respect to time or crank angle at idle or low speed and at high speed, respectively, are shown by the curves a and d and indicated in broken lines. In these curves, the actual time the injection valve is open is indicated as either t (time) or θ (crank angle). The time of energization of the actuating solenoid is indicated by the solid line curves identified by the reference characters TW. It will be noted that there is a lag, for readily apparent reasons, between the time when the solenoid is energized and the time when the injection valve is actually opened and also between the time when the solenoid is de-energized and the injection valve closes.

As may be readily seen from FIG. 3, the curve a provides a gradually increasing rate of fuel discharge up until a peak, which occurs after the solenoid has been de-energized, and then rapidly falls off as the valve closes. The problem with this type of injection is that the fuel is delivered primarily at the end of the injection cycle and this may not insure complete combustion nor good fuel economy.

At high speeds, on the other hand, the fuel delivery builds up rapidly to a peak which occurs at approximately the time the solenoid is de-energized and then falls rapidly. Said another way, the rate of peak fuel delivery is at approximately the mid-point of the time when the injection valve is opened. This type of fuel delivery tends to introduce too much fuel early in the combustion cycle and can give rise to knocking, pre-ignition and other engine related combustion noises, particularly in diesel engines. In addition, the type of fuel delivery provided by conventional nozzles as indicated by the curve d tends to reduce the maximum output of the engine for a given amount of fuel consumed.

It is, therefore, a principal object of this invention to provide an improved accumulator type injection nozzle.

It is a further object of this invention to provide an improved accumulator type injection nozzle that will provide good fuel control at low speeds even with pressure variations.

It is a further object of this invention to provide an improved accumulator type injection nozzle wherein the sensitivity of fuel discharge at low pressures is reduced without adversely effecting the amount of fuel which can be discharged at high pressures.

It is a further object of this invention to provide an improved arrangement for operating an accumulator type injection nozzle so as to cause smaller changes in fuel discharge with pressure changes under low pressure conditions than at high pressure conditions.

It is a further object of this invention to provide an improved accumulator type of fuel injection nozzle that will provide the introduction of greater amounts of fuel into the engine at the beginning of the injection cycle than conventional injectors at low engine speeds and loads.

It is another object of this invention to provide an improved accumulator type fuel injector that will supply the peak rate of fuel discharge into the engine at high speeds and high loads at the end of the injection cycle.

SUMMARY OF THE INVENTION

This invention is adapted to be embodied in an accumulator type injection nozzle comprising an accumulator chamber for containing fuel under pressure and a discharge port that communicates the accumulator chamber with an engine for injecting fuel thereto. An injection valve controls the communication to the accumulator chamber with the discharge port for controlling the discharge of fuel to the engine. A control chamber communicates with the accumulator chamber for receiving fuel under pressure therefrom and the injector valve has a portion received in the control chamber for urging the injection valve to its closed position under the influence of fuel pressure in the control chamber. A control valve is provided for selectively relieving the pressure in the control chamber to effect opening of the injection valve and the injection of fuel to the engine from the discharge port. Means are provided for increasing the rate of fuel injected and maintaining it uniform during the mid range of the injection cycle under low engine speeds and for causing the peak rate of injection rate of discharge under high loads to occur at the latter portion of the injection cycle.

DETAILED DESCRIPTION OF THE PREFERRED EMBODIMENTS OF THE INVENTION

Figure 5:
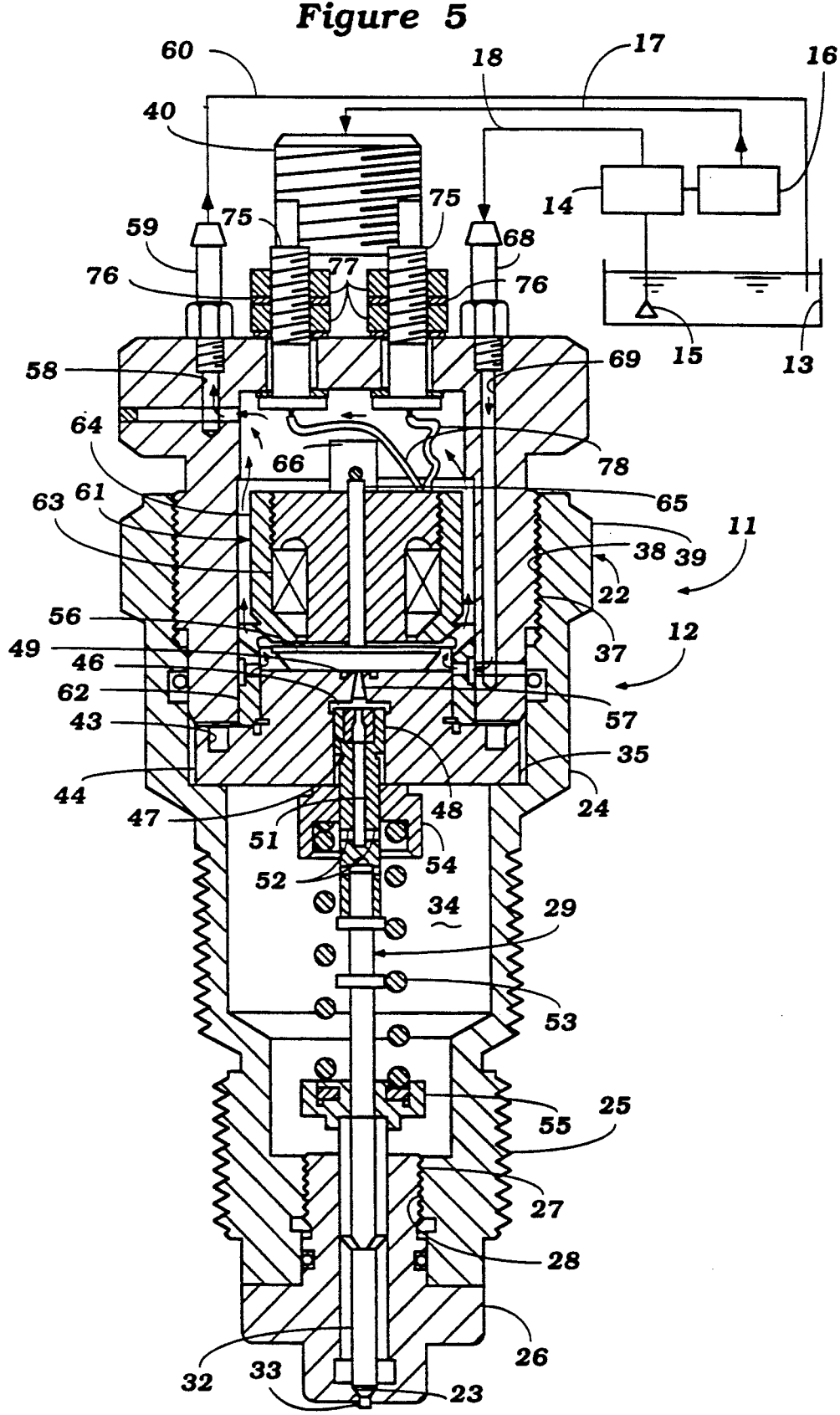
FIG. 5 is a cross sectional view taken through a fuel injector constructed in accordance with an embodiment of the invention and a portion of the related fuel system shown schematically.

Referring in detail initially to FIG. 5, a fuel injection system for an internal combustion engine is shown partially schematically and is identified generally by the reference numeral 11. The system includes one or more accumulator type fuel injectors, indicated generally by the reference numeral 12, and constructed in accordance with an embodiment of the invention. The full system for supplying fuel to the injectors 12 is not depicted because the invention is capable of use with any of a wide variety of types of fuel systems. However, in order to understand the construction of certain of the components, a portion of the system has been shown schematically and this includes a fuel tank 13. A low pressure pump 14 draws fuel from the fuel tank 13 through a filtering screen 15 and delivers it to a high pressure pump 16. The high pressure pump 16 then delivers the fuel to the injector 12 through a high pressure line 17. In addition, low pressure fuel is also supplied to the injectors 12 through a low pressure line 18 for a reason to be described.

The injection nozzle 12 is comprised of an outer housing assembly, indicated generally by the reference numeral 22 that is adapted to be mounted, in a manner to be described, in the cylinder head of an internal combustion engine with a delivery port 23 communicating with the combustion chamber for delivering fuel to it in a manner to be described. Rather than direct cylinder injection, the invention may be utilized in conjunction with manifold injection systems but the invention has particular utility with direct injection, for example as used with high speed diesel engines.

The outer housing 22 is comprised of a lower piece 24 that has a threaded lower end 25 that is adapted to be threaded into a suitable aperture in the cylinder head of the associated engine (not shown) in a known manner. The delivery port 23 is defined by a tip 26 that has a threaded portion 27 that is received in a threaded bore 28 formed at the lower end of the housing piece 24.

An injection valve 29 is slidably supported within a bore 31 of the nozzle piece 26 and has a reduced diameter portion 32 and a flow controlling tip 33 which, in the closed position, closes the delivery port 23. The valve portion 32 has interrupted enlargements for slidably supporting the injection valve 29 in the bore 31 in a known manner.

An accumulator chamber 34 is formed above the bore 31 by the housing piece 24. The accumulator chamber 34 is closed at its upper end by means of a closure plate 35 that is held against a shoulder in the housing piece 24 by a second housing piece 36. The housing piece 36 has a threaded portion 37 that is received within a threaded bore 38 of the housing piece 24 so as to hold the closure plate 35 in position and maintain the chamber 34 in a sealed condition, except as is hereinafter noted. Externally of the threaded opening 38, the housing piece 24 is formed with a hexagonal portion 39 so as to facilitate its insertion into the threaded bore of the cylinder head.

The housing piece 36 is formed with an inlet conduit 41 that has a threaded external portion 40 so as to receive a fitting for connecting the supply line 17 extending from the high pressure pump 16 to the inlet conduit 41.

Figure 6:
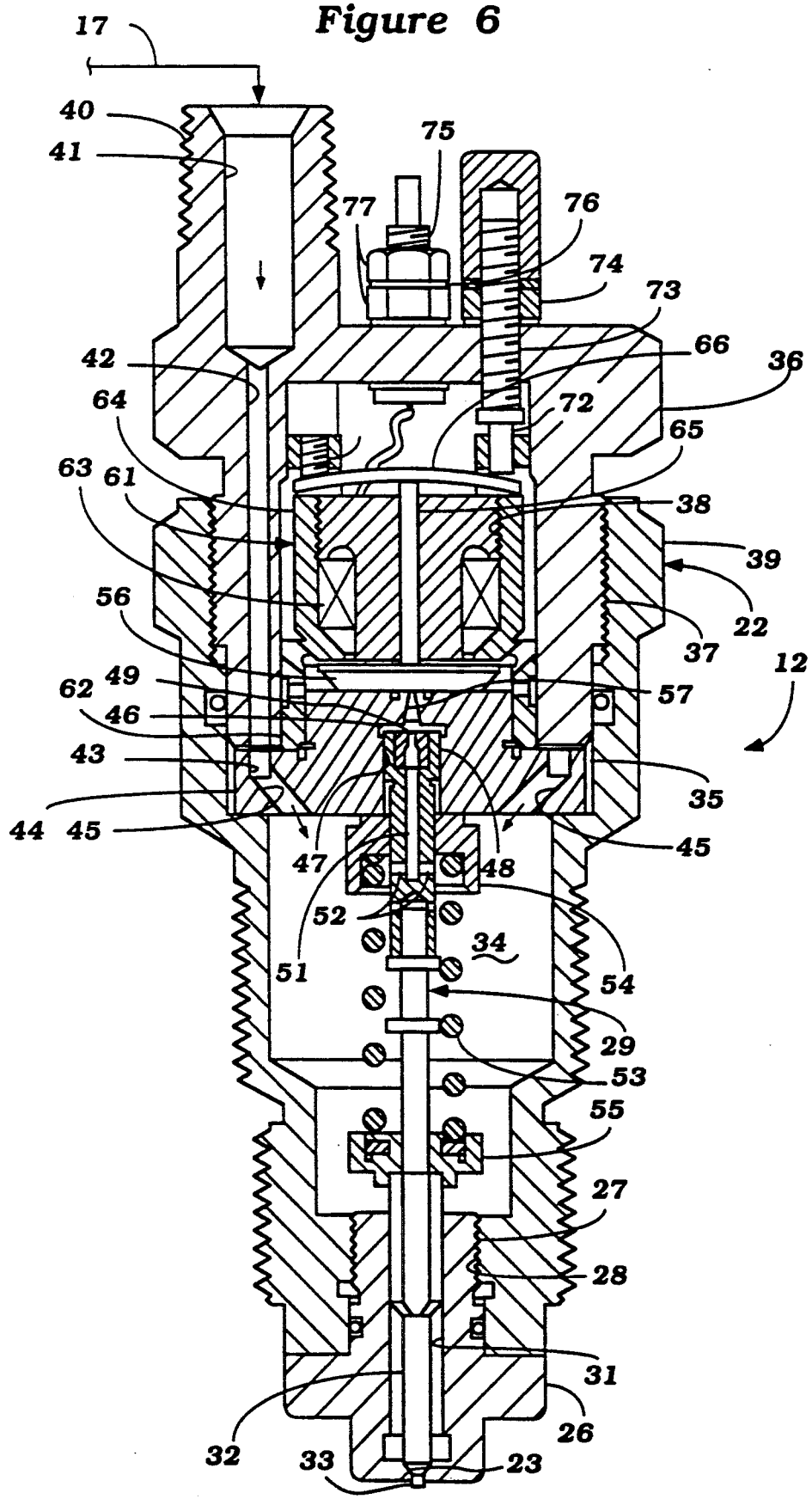
FIG. 6 is a cross sectional view of the fuel injector taken along a plane perpendicular to the plane of FIG. 5.

The inlet conduit 41 (FIG. 6) which is generally a drilled opening, is intersected by a further drilled passageway 42 that extends axially along the housing piece 36 at one side thereof and which communicates at its lower end with a corresponding circumferential groove 43 formed in the upper face of a cylindrical portion 44 of the closure plate 35. The groove 42 is intersected by bores 45 which extend into the accumulator chamber 34 for delivering fuel under pressure to the accumulator chamber 34.

A control chamber 46 is formed in the closure plate 35 by means of a bore 47 that opens through the lower end of the closure plate 35. The injection valve 29 has a generally cylindrical actuator portion 48 that is slidably supported within the bore 47 and which closes the lower end of the control chamber 46. A restricted orifice 49 fixed in the end of the actuator portion 48 communicates an axial passage 51 of the portion 48 and radial ports 52 with the accumulator chamber 39. The control chamber 46 communicates with the orifice 49 to receive the pressurized fuel and normally urge the injection valve 29 toward its downward or closed position.

A coil compression spring 53 encircles the injection valve 29 and bears against a retainer plate 54 at its upper end. The lower end of the spring 53 engages a cup shaped retainer 55 that is held axially in position against a shoulder formed by an enlargement on the injection valve 29 so as to further assist in maintaining the injection valve 29 in the closed position as shown in the drawings. The retainer plate 54 is preloaded, in a manner to be described.

A control valve 56 is supported within the upper end of the closure plate 35 and controls the opening of a control valve port 57 formed in the upper end of the closure plate 35 and communicating with the control chamber 46. The control valve 56 comprises a headed portion that also acts as an armature plate. The control valve 56 is biased toward its closed position with the control valve port 57 in a manner to be described.

The control valve 56 when opened will permit the fuel in the control chamber 46 to return to the tank 13 through a return passageway 58 that extends axially through the end of the housing piece 36 parallel to the inlet passageway 42. The return passageway 58 communicates with a conduit 60 through a fitting 59. Fuel can flow from the control valve port 57 to the return passageway 58 through suitable internal passageways or clearances to permit this return flow, which is relatively small in volume.

The control valve 56 is opened and closed so as to control discharge of fuel for the delivery port 23 by means of an electromagnetic assembly, indicated generally by the reference numeral 61. This electromagnetic assembly 61 includes a generally cylindrical yoke 62 that has an opening at an enlarged diameter lower end portion which is received on a cylindrical portion of the closure plate 35 so as to secure the electromagnetic assembly 61 in position.

The electromagnetic assembly 61 is comprised of a solenoid coil or winding 63 that is disposed at the lower end of a housing or yoke 64 which encircles an armature and is integrally formed with the yoke 62. The armature is formed with a bore that slidably supports a plunger 65 of the control valve 56. A leaf type spring 66 is carried by the yoke 64 and bears against the upper end of the plunger 65 for urging the control valve 56 to its closed position.

It should be noted that the yoke 64 has a smaller diameter than the corresponding bore 67 of the housing piece 36 so as to define a clearance therebetween which acts as a cooling jacket around the solenoid winding 63.

As has been previously noted, fuel is circulated through this cooling jacket from the low pressure feed pump 14 through the conduit 18. The conduit 18 communicates with a fitting 68 affixed to the housing piece 36 and communicates with a conduit 69 formed therein for delivering fuel to this cooling jacket. The fuel thus circulated is returned through the passage 58 and fitting 59 which, as has been noted, also returns the fuel that is dumped from the control chamber 46 when the control valve 56 is opened.

The tension of the spring 66 is adjusted by means of a fixed stop pin 71 (FIG. 6) that engages one end of the leaf spring 66 and an adjustable stop 72 that engages the other end. The adjustable stop 72 has a threaded portion 73 that is threaded into a lock nut assembly 74 for adjusting the preload on the spring 66.

The circuit for energizing the coil 63 of the electromagnet assembly 61 for opening the control valve 56 includes a pair of terminal posts 75 that extend through the upper end of the hosing piece 36 with electrical tab connectors 76 which are held on the posts 75 in electrical contact with them between a respective pair of nuts 77 so as to afford attachment to an appropriate lead of a circuit with a valve driver. Wires 78 are connected to the posts 71 to complete the connection to the winding 63.

The condition shown in the Figures is that which occurs when the winding 63 is de-energized. When the winding 63 is de-energized, the control valve 56 will be held in its closed position by the spring 66 so that the accumulator chamber 34 and control chamber 46 may be pressurized.

At the appropriate instant for fuel injection to begin, which may be controlled in any suitable strategy, the winding 63 is energized. When this happens, the relief valve armature 56 will be attracted upwardly by the flux in the armature of the solenoid 61 so as to urge the valve portion 65 upwardly and open the control valve 56 against the action of the spring 66. The pressure in the control chamber 46 will then be rapidly depleted and the higher pressure of the fuel acting in the accumulator chamber 34 will urge the injection valve 29 upwardly and permit fuel to issue from the discharge port 23. When the fuel pressure in the accumulator chamber 34 has been depleted, the spring 53 will move the injection valve 29 to its closed position and the fuel pressure can then build up in the accumulator chamber 34. This action is initiated by discontinuing the energization of the winding 63 so as to close the control valve 56 and permit pressure in the control chamber 46 to again build up.

Figure 1:
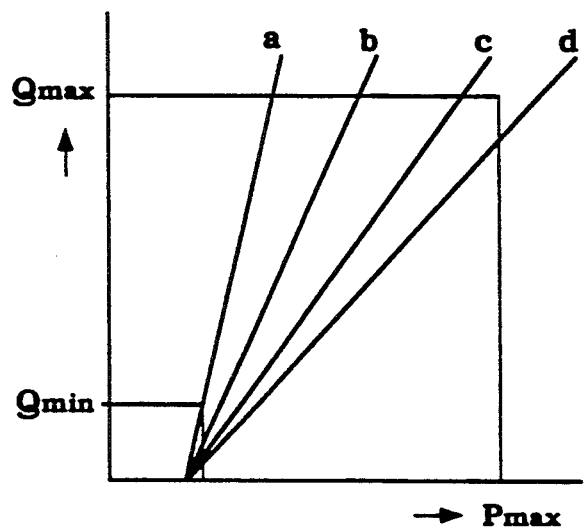
FIG. 1 is a graphic view showing the amount of fuel discharged in relation to fuel pressure in the accumulator chamber in accordance with the prior art type of constructions.
Figure 2:
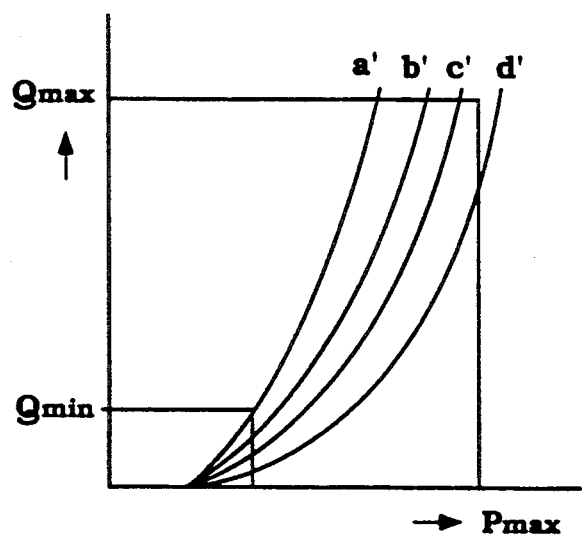
FIG. 2 is a graphical view, in part similar to FIG. 1, and shows the fuel discharge characteristics in response to fuel pressure in the accumulator chamber in accordance with the embodiment of this invention.

The construction of the injector 12 as thus far described may be considered to be conventional. That is, all of the components and the parts thereof are arranged, for the purposes of discussion, in accordance with prior art teachings. However, in accordance with the invention the proportions of certain of the components, as will be described, is changed from the prior art type of construction so as to achieve the flow delivery curves a', b', c' and d' of FIG. 2. In addition to employing changes in the geometrical relationship of the parts and, as will become apparent, the preloading of the spring 53 and its rate, the control circuit for energizing and de-energizing the winding 63 also varies, in some regards, from the previous control so as to achieve these results.

Figure 7:
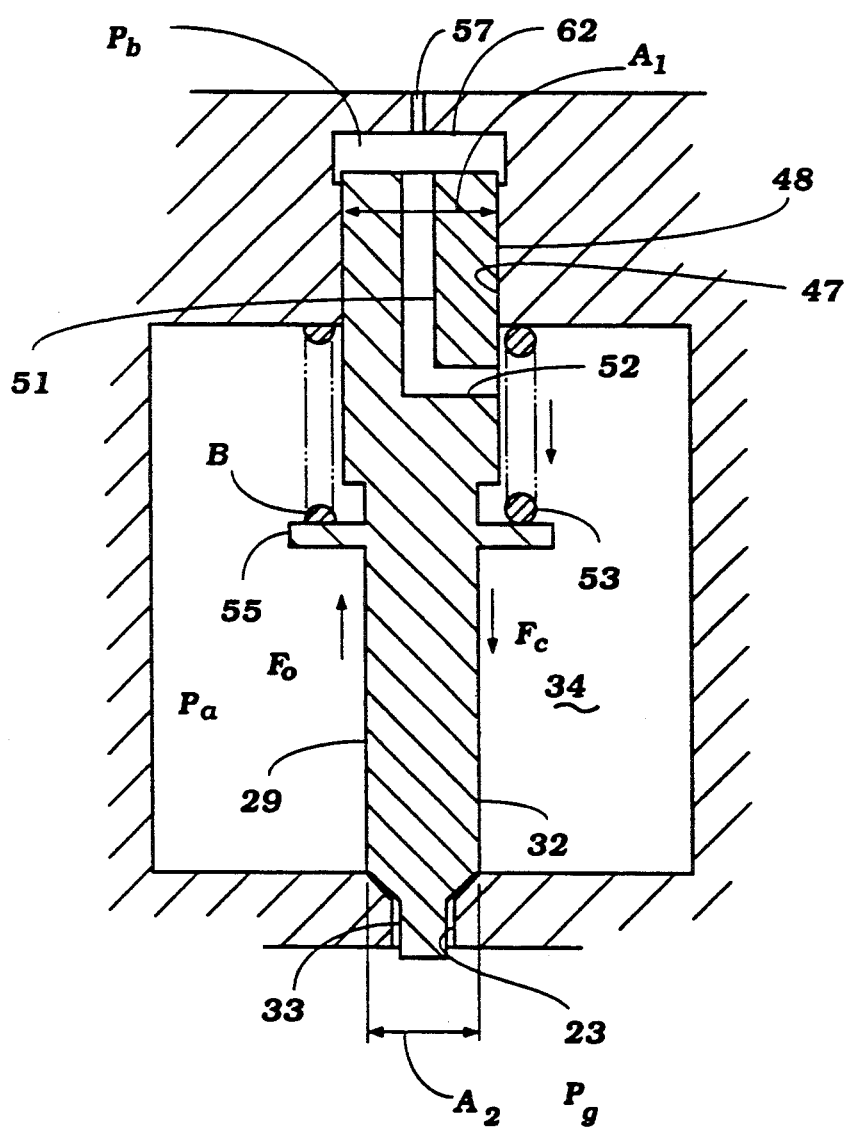
FIG. 7 is an enlarged cross sectional view in partially schematic form to explain how the embodiment operates.

These relationships and their effect may be best understood by reference to FIG. 7, which is a partially schematic diagrammatic view showing the various forces acting on the injector valve 29 tending to open and close it. As seen in this Figure, the opening force is identified by the vector $F_o$ and the closing force indicated by the vector $F_o$. In addition to the pressures of fuel in the accumulator chamber 34 $P_a$ and the pressure of the fuel in the control chamber 62 ($P_g$) there is also the pressure in the combustion chamber ($P_g$). There is also the force of the spring 53 and this force is equal to the spring force B, which is equal to the spring constant multiplied by the deflection of the spring. Furthermore, there is the initial preload of the spring which may be expressed as $B_s$. The opening and closing forces may be expressed as being approximately equal to the following equations:

$$F_o = [P_a X(A1-A2) + P_g X A2] - [B+B_s] - P_b X A1,$$

$$F_c = [P_b X A1 + B + B_s] - [P_a X(A1-A2) + P_g X A2].$$

In accordance with the invention, the diameter of the actuating portion 48 of the injection valve 29 is decreased from the standard 4.2 mm to about 2.5 mm so as to accordingly decrease its cross sectional area and also to decrease the volume of the control chamber 62 from 4.2 mm$^3$ to about 1.5 mm$^3$. The diameter of the reduced portion 32 of the injector valve 29 is the same as the conventional structure but the ratio between the diameters A1 and A2 is reduced towards unity with this invention since the diameter A2 is equal to about 1.4 mm. The initial preload of the spring 53 is decreased from prior preloads of about 5 kg to 1.5 kg to make the fuel pressure at the start of injection opening equal to that of a conventional one. The spring constant, however, for the spring 53 is increased from 5 kg per cm to about 40 kg per cm. As a result of this relationship, and as should be apparent from the foregoing formula, the effective valve opening force $F_o$ when the pressure $P_b$ in the control chamber 62 is relieved becomes smaller and the effective valve closing force $F_c$ when the pressure $P_b$ in the control chamber 62 is built up becomes greater.

Figure 3:
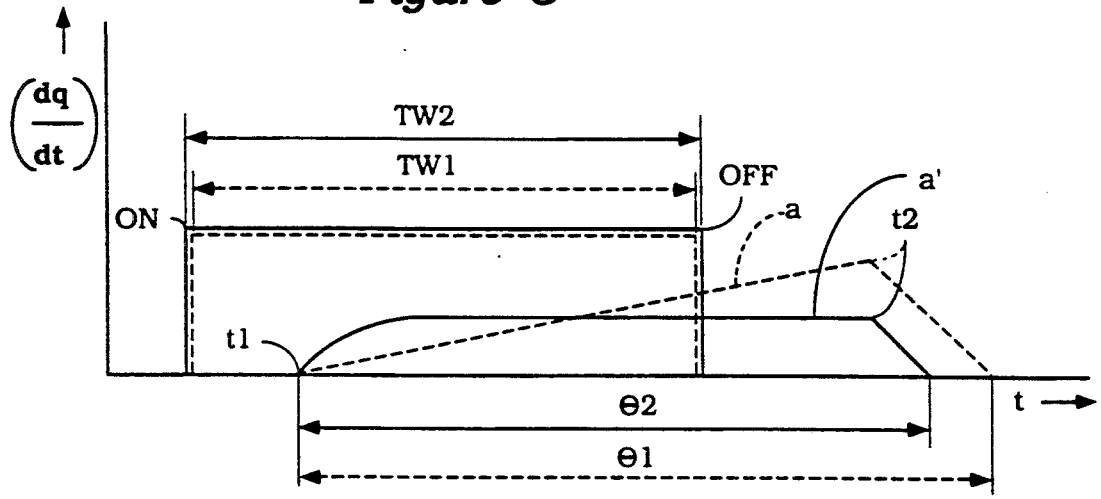
FIG. 3 is a graphical view showing the injection rate of fuel delivery during a single cycle with a conventional accumulator type fuel injector and an accumulator type fuel injector constructed in accordance with an embodiment of the invention.

The effect of this during idle and other low speed operation may be seen by reference to FIG. 3 wherein the fuel rate of delivery curve with respect to time (i.e. crank angle) is indicated at the curve a by the solid line curve a'. As may be seen when the injection valve 29 is opened at the point $t_1$ by energizing the solenoid winding 63 the injection rate raises much more rapidly than with a conventional valve due to the fact that the initial spring preload $B_s$ has been reduced. However, the actual amount of opening of the valve will be less than with conventional valves because of a smaller effective valve opening force $F_o$ and the relatively low fuel pressure. As a result of this, the injection rate during this time delivery pattern is nearly constant throughout the entire injection period $\Theta_2$. In this embodiment the time of energization of the solenoid 63 TW2 is substantially the same as that of a conventional solenoid and valve TW1. However, the injection duration $\Theta_2$ will be smaller since the valve will close more quickly. The time at which both valves are closed $t_2$ is substantially the same, but the valve in accordance with this embodiment will close much faster than that of the prior art type of valve.

Figure 4:
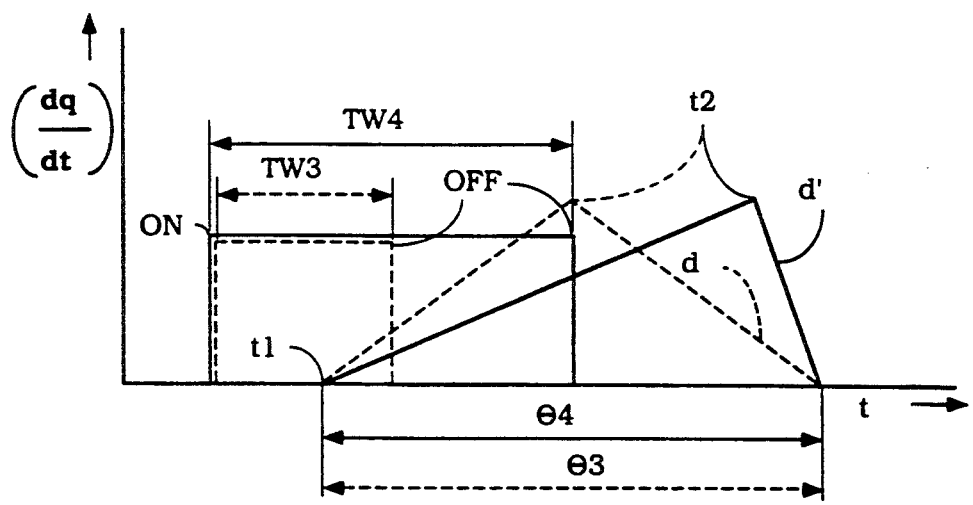
FIG. 4 is a graphical view, in part similar to FIG. 3, and shows the injection rates at high speed high load conditions.

At high load high rpm (FIG. 4) the injection rate in accordance with this invention rises less steeply than with the prior art constructions because of the smaller effective valve opening force $F_o$ caused by the smaller difference in the sectional areas A1 and A2 and the larger spring constant. Hence, it is necessary to energize the solenoid 63 for a longer period of time TW4 than with the conventional structure TW3 to maintain the same duration of injection valve opening. However, it should be noted that the injection valve 29 will close much more rapidly because the smaller volume of the control chamber 62 causes the pressure rise to occur there much more rapidly and because the larger spring constant causes a larger effective valve closing force $F_c$. Hence, it will be seen that the peak rate of fuel delivery is supplied at the end of the cycle rather than midway in the cycle with the conventional construction. Therefore, a better fuel supply curve can be provided under all running conditions.

In the described embodiment, these results have been obtained through the variance of the various diameters of the portions of the injector valve 29, the spring preload and spring rate. Of course, these types of injection curves can be achieved through other means which are well within the scope of those skilled in the art and within the spirit and scope of the invention, as defined by the appended claims.

I claim:

1. An accumulator type injection nozzle comprising an accumulator chamber for containing fuel under pressure, a discharge port for communicating said accumulator chamber with an engine for injecting fuel thereto, an injector valve for controlling the communication of said accumulator chamber with said discharge port for controlling the discharge of fuel to said engine, a control chamber communicating with said accumulator chamber for receiving fuel under pressure therefrom, said injector valve having a portion received in said control chamber for urging said injector valve to its closed position under the influence of fuel pressure in said control chamber, control valve means for sequentially relieving the pressure in said control chamber to achieve opening of said injector valve and the injection of fuel to said engine from said discharge port, and means for providing a substantially constant rate of discharge of fuel injected at low speed and low load conditions during the mid range of the time of injection and for causing the peak injection rate of discharge under higher load conditions to occur at the latter portion of the injection period.

2. An accumulator type injection nozzle as set forth in Claim 1 wherein the rates of fuel discharge are provided by maintaining a relatively small ratio between the area of the portion of the injector valve in the control chamber and the area of the injector valve controlling the flow through the discharge port.

3. An accumulator type injection nozzle as set forth in Claim 2 wherein the rates of discharge are further controlled by maintaining a relatively small volume of the control chamber.

4. An accumulator type injection nozzle as set forth in Claim 3 further including biasing spring means for urging the injector valve to its closed position.

5. An accumulator type injection nozzle as set forth in Claim 4 wherein the means for providing the rates of discharge comprises providing a relatively low preload on the biasing spring means.

6. An accumulator type injection nozzle as set forth in Claim 4 wherein the means for providing the rate of discharge comprises providing a relatively high spring rate for the biasing spring means.

7. An accumulator type injection nozzle as set forth in Claim 6 wherein the means for providing the rates of discharge also comprises providing a relatively low preload on the biasing spring means.

8. An accumulator type injection nozzle as set forth in Claim 1 further including biasing spring means for urging the injector valve to its closed position.

9. An accumulator type injection nozzle as set forth in Claim 8 wherein the means for providing the rates of discharge comprises providing a relatively low preload on the biasing spring means.

10. An accumulator type injection nozzle as set forth in Claim 8 wherein the means for providing the rate of discharge comprises providing a relatively high spring rate for the biasing spring means.

11. An accumulator type injection nozzle as set forth in Claim 10 wherein the means for providing the rates of discharge comprises providing a relatively low preload on the biasing spring means.

* * * * *